United States Patent
Condon et al.

(10) Patent No.: US 12,496,621 B2
(45) Date of Patent: Dec. 16, 2025

(54) CLEANING CARD WITH DEFORMABLE CLEANING ELEMENTS FOR MEDIA TRANSPORT DEVICE

(71) Applicant: KICTeam, Inc., Auburn, ME (US)

(72) Inventors: John Condon, Sumner, ME (US); Geoffrey Scott Caron, Sabattus, ME (US)

(73) Assignee: KICTeam, Inc., Auburn, ME (US)

( * ) Notice: Subject to any disclaimer, the term of this patent is extended or adjusted under 35 U.S.C. 154(b) by 0 days.

(21) Appl. No.: 18/366,587

(22) Filed: Aug. 7, 2023

(65) Prior Publication Data

US 2024/0307924 A1     Sep. 19, 2024

Related U.S. Application Data

(60) Provisional application No. 63/489,829, filed on Mar. 13, 2023.

(51) Int. Cl.
| | |
|---|---|
| *B08B 1/12* | (2024.01) |
| *A46B 1/00* | (2006.01) |
| *A46B 9/02* | (2006.01) |
| *B08B 1/14* | (2024.01) |
| *B08B 1/20* | (2024.01) |
| *G06K 13/08* | (2006.01) |

(52) U.S. Cl.
CPC .............. *B08B 1/12* (2024.01); *A46B 1/00* (2013.01); *A46B 9/02* (2013.01); *B08B 1/143* (2024.01); *B08B 1/20* (2024.01); *G06K 13/0893* (2013.01); *A46B 2200/3073* (2013.01)

(58) Field of Classification Search
None
See application file for complete search history.

(56) References Cited

U.S. PATENT DOCUMENTS

| | | |
|---|---|---|
| 5,153,964 A | 10/1992 | Gelardi et al. |
| 6,243,908 B1 | 6/2001 | Battle et al. |
| 7,540,055 B1 | 6/2009 | Bailey |
| 7,732,040 B2 | 6/2010 | Klein et al. |

(Continued)

OTHER PUBLICATIONS

International Search Report and Written Opinion for International PCT Patent Application No. PCT/US2024/013571, mailed Apr. 19, 2024 (12 pages), 11 Pages.

*Primary Examiner* — Kaj K Olsen
*Assistant Examiner* — Arlyn I Rivera-Cordero
(74) *Attorney, Agent, or Firm* — Fox Rothschild LLP

(57) ABSTRACT

Cleaning cards and methods of using cleaning cards to clean interior components of a media transport device are disclosed. The cleaning card comprises a substrate having a cleaning layer material and a deformable cleaning element. The deformable cleaning element comprises a border that surrounds an opening. The opening is substantially filled with bristles, each of which comprises the cleaning layer material and extends from the border into opening. The bristles are co-planar with a lateral plane of the substrate before the cleaning card is used to clean a media transport device. The card is received into the device, and the bristles are positioned against a drive roller in a media transport path of the device. The drive roller is turned, which causes the bristles to deform and extend from the lateral plane of the substrate in multiple directions while contacting and cleaning the drive roller.

20 Claims, 10 Drawing Sheets

(56) References Cited

U.S. PATENT DOCUMENTS

| | | |
|---|---|---|
| 8,323,779 B2 | 12/2012 | Bailey et al. |
| 10,839,270 B2 | 11/2020 | Bailey et al. |
| 10,860,902 B2 | 12/2020 | Bailey et al. |
| 11,110,492 B2 | 9/2021 | Bailey et al. |
| 11,410,003 B2 | 8/2022 | Bailey et al. |
| 2007/0026198 A1 | 2/2007 | Bouchard |
| 2010/0119765 A1* | 5/2010 | Kabis ................ G06K 13/0893 428/90 |
| 2019/0095767 A1* | 3/2019 | Bailey ................... G06K 13/04 |
| 2022/0258214 A1 | 8/2022 | Condon et al. |
| 2022/0261604 A1 | 8/2022 | Larsen et al. |

* cited by examiner

CLEANING CARD WITH DEFORMABLE CLEANING ELEMENTS FOR MEDIA TRANSPORT DEVICE

RELATED APPLICATIONS AND CLAIM OF PRIORITY

This patent document claims priority to U.S. Provisional Patent Application No. 63/489,899, filed Mar. 13, 2023, the disclosure of which is fully incorporated into this document by reference.

BACKGROUND

Many machines have media transport mechanisms that receive printed media into the machine and move the media through one or more sections of the machine to perform various processes on the media. For example, a financial transaction terminal such as an automated teller machine may do any or all of the following steps: (i) receive printed currency notes, checks, receipts, coupons, transaction cards, tickets and other printed media; (ii) align the media to an internal reference; (iii) use a camera and/or other sensors to detect what the media is and/or what is printed on the media; (iv) apply additional printed markings to the media; and/or (v) move the media to an appropriate shuttle, bin or exit port. The terminal may perform some or all of these steps, and/or additional steps. Other machines that include media transport mechanisms include coupon printers, ticket printers, ticket-taking devices and other printed media handling systems.

Because media transport devices carry transaction cards and other objects that can be handled by human hands, the media transport device can be exposed to various environmental conditions. For example, the insertion of a card into a card reading device can introduce dirt, oil and/or other contaminants into the media transport device. When such contaminants touch a reading device's contacts, reading head, drive rollers, idler rollers, belts, sensors, or other components of the device, it may cause the reader to malfunction.

The removal of contaminants from a media transport mechanism is a labor-intensive and time-consuming process. It requires a technician to open the device and carefully clean small parts by hand. Many of these parts are in small, hard-to-reach spaces. Thus, manual cleaning is difficult, and it is not always effective.

This document describes methods and systems directed to solving some of the issues described above, and/or other issues.

SUMMARY

In a method embodiment, a method of cleaning interior components in a media transport path of a media transport device is disclosed. The method includes receiving a cleaning card into the media transport path of the media transport device. The cleaning card comprises a substrate having a cleaning layer material and a deformable cleaning element, in which: (a) the deformable cleaning element comprises a border that surrounds an opening, and the opening is substantially filled with a plurality of bristles, each of which comprises the cleaning layer material and extends from the border into the opening; and (b) the bristles are co-planar with a lateral plane of the substrate before the cleaning card is used to clean the media transport device. The method also includes positioning the bristles against a drive roller in the media transport path of the media transport device. The method also includes turning the drive roller, and in turn causing the bristles to deform and extend from the lateral plane of the substrate in a plurality of directions while contacting and cleaning the drive roller. The method may then include moving the cleaning card out of the media transport path.

Optionally, turning the drive roller comprises manually operating the drive roller and/or causing a motor to turn the drive roller.

Optionally, the drive roller may be positioned opposite an idler roller of the media transport device. If so, then turning the drive roller also causes the bristles to contact and clean the idler roller.

Optionally, the border may comprise a cut line or perforation in the substrate that extends along the border, except for positions in which the bristles extend from the border into the opening. Each of the bristles may have a first end and a second end; the first end of each bristle may be attached to the border, and the second end of each bristle is separated from the border by the cut line or the perforation. In various embodiments, the cut line or the perforation may have a thickness of from approximately 0.012 inch to approximately 0.125 inch, from approximately 0.012 inch to approximately 0.25 inch, or other thicknesses within or outside of those ranges. Optionally, the bristles may extend from the border in a direction that is opposite an initial machine direction of the media transport device, and receiving the cleaning card into the media transport path may cause the first ends of the bristles to contact the drive roller before the second ends of the bristles contact the drive roller.

Optionally, receiving the card into the media transport path comprises receiving the card via a portal that is not accessible during normal operation of the media transport device.

Optionally, after receiving the cleaning card into the media path, the method may include initiating a cleaning mode in which a gate is closed to hold the cleaning card in the media transport path while the drive roller is turned. Upon completion of the cleaning mode, the gate will be opened to permit the cleaning card to move out of the media transport path.

In a device embodiment, a media transport device cleaning card includes a substrate comprising a cleaning layer material, and one or more deformable cleaning elements. Each deformable cleaning element comprises a border that surrounds an opening in the substrate. Each opening is filled with a plurality of bristles. Each of the bristles comprises the cleaning layer material and extends from the border into the opening. The bristles may be co-planar with a lateral plane of the substrate before the cleaning card is used to clean a media transport device.

Optionally, the border of each opening comprises a cut line or perforation in the substrate that extends along the border, except for positions in which the bristles extend from the border into the opening. Also optionally, each of the bristles has a first end and a second end, the first end of each bristle is attached to the border of a corresponding opening, and the second end of each bristle is separated from the border of the corresponding opening by the cut line or the perforation. The cut line or the perforation may have a thickness of from approximately 0.012 inch to approximately 0.125 inch, from approximately 0.012 inch to approximately 0.25 inch, or other thicknesses within or outside of those ranges.

Optionally, after the cleaning card is used to clean the media transport device, the bristles may extend from the lateral plane of the substrate in a plurality of directions.

Optionally, the cleaning layer material may comprise an unbroken loop material or a flocked material.

Optionally, the bristles may extend from the side of the opening in a direction that is opposite an initial machine direction of the media transport device.

Optionally, the card may further comprise a support layer that is attached to the cleaning layer material, wherein the support layer is more rigid than the cleaning layer material In a system embodiment, the system includes a media transport device that comprises a media transport path, and a drive roller positioned to move media along the media transport path. The system also includes a cleaning card that comprises a substrate comprising a cleaning layer material, and a deformable cleaning element comprising a border that surrounds an opening in the substrate. The opening is filled with a plurality of bristles. Each of the bristles comprises the cleaning layer material and extends from the border into the opening, and the opening is positioned to contact the drive roller when the cleaning card is received into the media transport path.

Optionally, the bristles of the system's card are configured to be co-planar with a lateral plane of the substrate before the cleaning card is used to clean a media transport device, and the bristles are configured to extend from the lateral plane of the substrate in a plurality of directions after the cleaning card is used to clean the media transport device.

Optionally, the media transport device of the system is configured to, after receiving the cleaning card into the media path: (a) initiate a cleaning mode that closes a gate and holds the cleaning card in the media transport path while the drive roller is turned; and (b) upon completion of the cleaning mode, open the gate to permit the cleaning card to move out of the media transport path.

DETAILED DESCRIPTION

In this document, the singular forms "a," "an," and "the" include plural references unless the context clearly dictates otherwise. The term "comprising" means "including, but not limited to." Similarly, the term "comprises" means "includes, and is not limited to." Unless defined otherwise, all technical and scientific terms used in this document have the same meanings as commonly understood by one of ordinary skill in the art.

In this document, terms that are descriptive of relative position such as "upper" and "lower", "top" and "bottom", "horizontal" and "vertical" and the like are intended to indicate relative positions with respect to the components for which those terms are descriptive, and are not intended to be absolute and require that the component remain in that absolute position in all configurations.

Except where specifically stated otherwise, numeric descriptors such as "first", "second", etc. are not intended to designate a particular order, sequence or position in an overall process or schema, but instead are simply intended to distinguish various items from each other by describing them as a first item, a second item, etc.

The terms "substantially" and "approximately", when used in reference to a value, means a range that is within +/−10% of the value. When used in reference to a feature of an object, such as a substantially planar surface, terms such as "substantially" and "approximately" mean that the primary portion of the object exhibits the feature, although other portions may deviate. For example, a cleaning card in the form of a card from which embossments and/or other raised surface elements extend is considered to be a substantially planar surface.

The terms "media transport system" and "media transport device" refer to a set of hardware components that are configured to receive printed media (i.e., a substrate onto which text and/or graphics have been printed) or digitally encoded media (such as a chip in a credit card) and move the media through one or more modules that perform various processing steps on the media, such as position adjustment, sensing, printing and/or delivery to a final destination. Thus, a card reading device as described in the Background section of this document is a type of media transport device. A "currency transport device" or "currency transport system" is a type of media transport device that is configured to process and convey printed financial instruments such as currency notes, checks, money orders, bank notes and the like, and digital financial instruments such as credit cards or debit cards.

Figure 1:
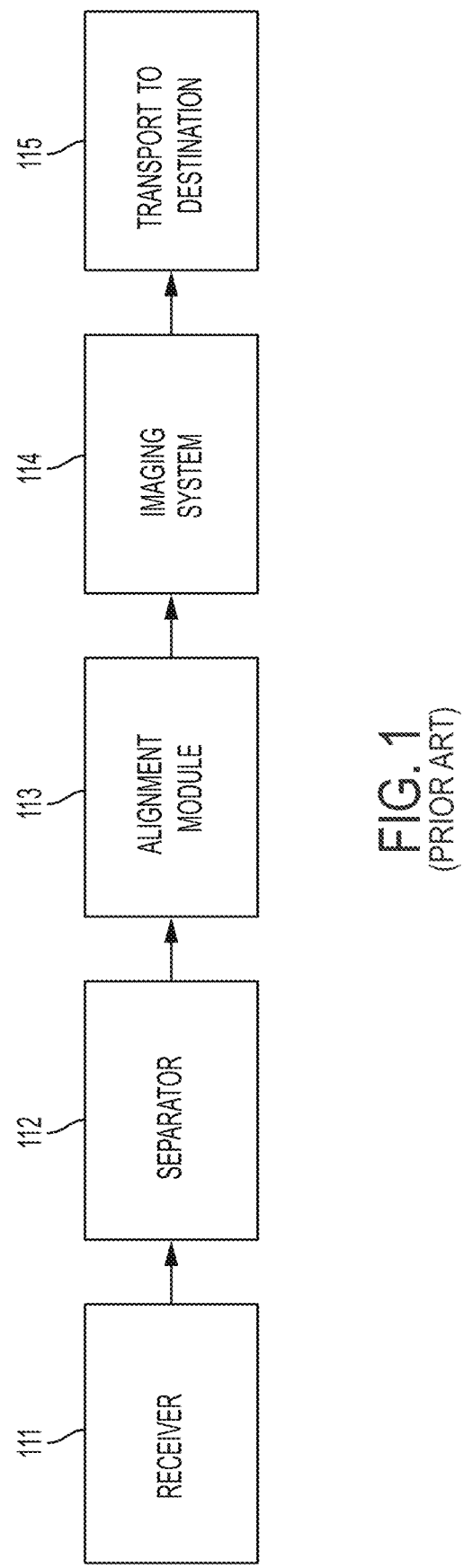
FIG. 1 illustrates example components of a media transport device, such as may exist in a prior art automated teller machine or ticket taking machine, in block diagram format.

FIG. 1 is a block diagram that illustrates example components of a media transport device, such as may exist in a prior art automated teller machine, credit card reader, or ticket taking machine. The media transport system includes components such as a receiver 111 that includes belts, rollers or other conveying mechanisms that will receive media into the system via a media portal—i.e., an opening in the device's housing. The media transport system also may include a separator module 112 that includes belts, rollers or other media conveyor devices that separate stacked printed media, such as stacked checks or currency notes. In currency transport systems, such rollers are sometimes referred to as "pick rollers" or "pick wheels." The media transport system also may include an alignment module 113 that includes belts, rollers or other conveying mechanisms that will adjust a position of the media with respect to an internal reference point. The media transport system also may include an imaging system 114 with a camera and/or other sensors and associated programming that can detect what the media is and/or what is printed on the media. The media transport system also may include a transport module 115 with one or more belts, rollers or other media conveyors that will move the printed media to an appropriate destination 116 such as a shuttle, bin or exit port. Any or all of the modules shown in FIG. 1 may include or by activated by a motor that, when operated, causes belts, rollers, or both of the media transport system to turn. The media transport system also may include other modules, such as a printer that can apply additional printed markings to the printed media. The areas within each module through which the printed media passes form a media travel pathway from the receiver's intake to the final destination.

Figure 2:
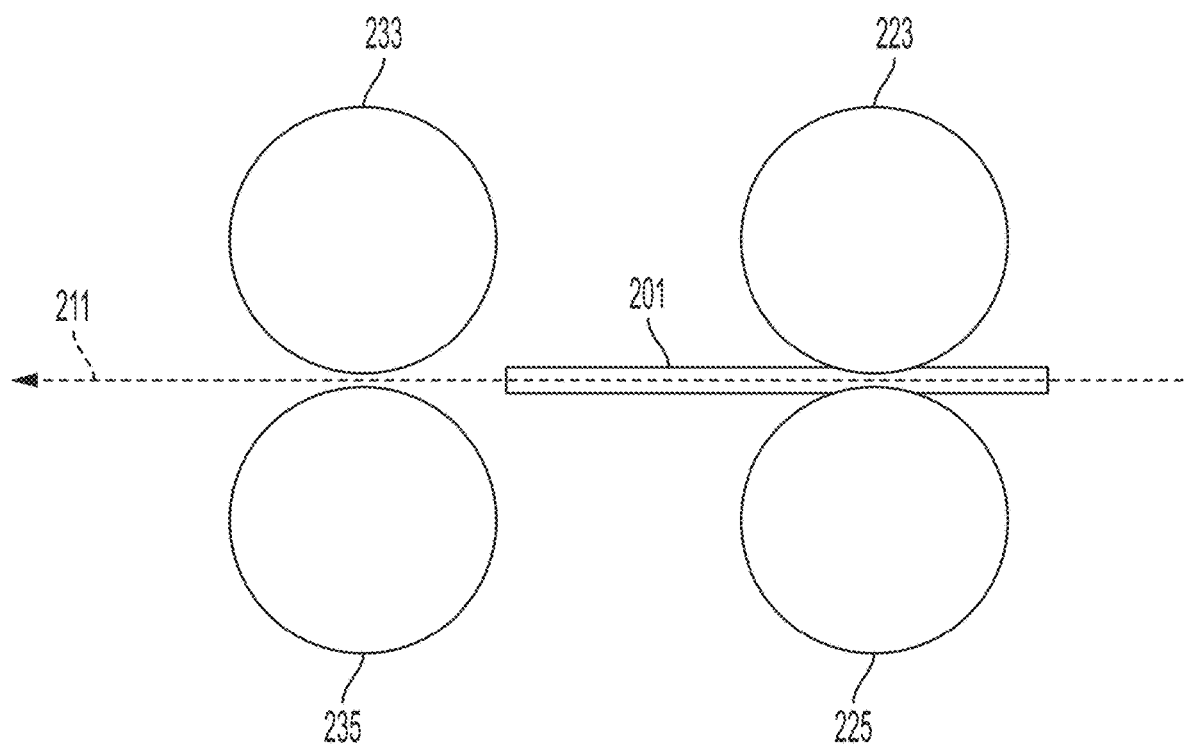
FIG. 2 illustrates example movement of media along a media transport path of a media transport device, such as may exist in the prior art.

The separator module, alignment module, and/or transport module all function to move media in a media transport path of the device. Referring to FIG. 2, currency, a transaction card, or other media 201 moves along a media transport path 211 of the media transport device. The media transport path 211 is identified as a dashed line, and the arrow indicates a machine direction in which the media moves along the path, in this case from right to left in FIG. 2. In such a situation, if the media transport path 211 is for a currency or ticket dispenser, the right side of the path may originate from one or more currency storage bins, the left side of the path may lead to an exit portal, and the machine direction will be right to left. If the media transport path 211 is for a credit card reader or a transportation ticket reader, the right side of the path may lead to an opening of the device, and the machine direction may be initially from right to left, but then reversed after the card or ticket is read so that the card or ticket can be moved out of the media transport path and returned to a user via the opening. Other configurations and machine directions are possible, depending on the application.

The device includes an idler roller 223 and drive roller 225 of the media transport system. To move media 201 along the path 211, the drive roller 225 presses against the media, and a motor turns the drive roller 225 to move the media through the media travel pathway. The idler roller 223 is positioned proximate to the drive roller 225 to serve as a backstop for the force of the drive roller 225. The idler roller 223 is typically not motorized, but instead is turned by the force of drive roller 225 pressing the media 201 against the idler roller 223. However, the idler roller 223 may be motorized in some embodiments. The printed media 201 passes between the idler roller 223 and drive roller 225. Optionally, one or more additional idler roller 233/drive roller 235 pairs may be positioned along the media transport path 211 to further move the media 201 along the path in the device. The idler rollers 223, 233 are optional; in some embodiments, instead of an idler roller the drive rollers may press the card against a belt, a conveyor, or any other moveable or stationary surface.

Figure 3:
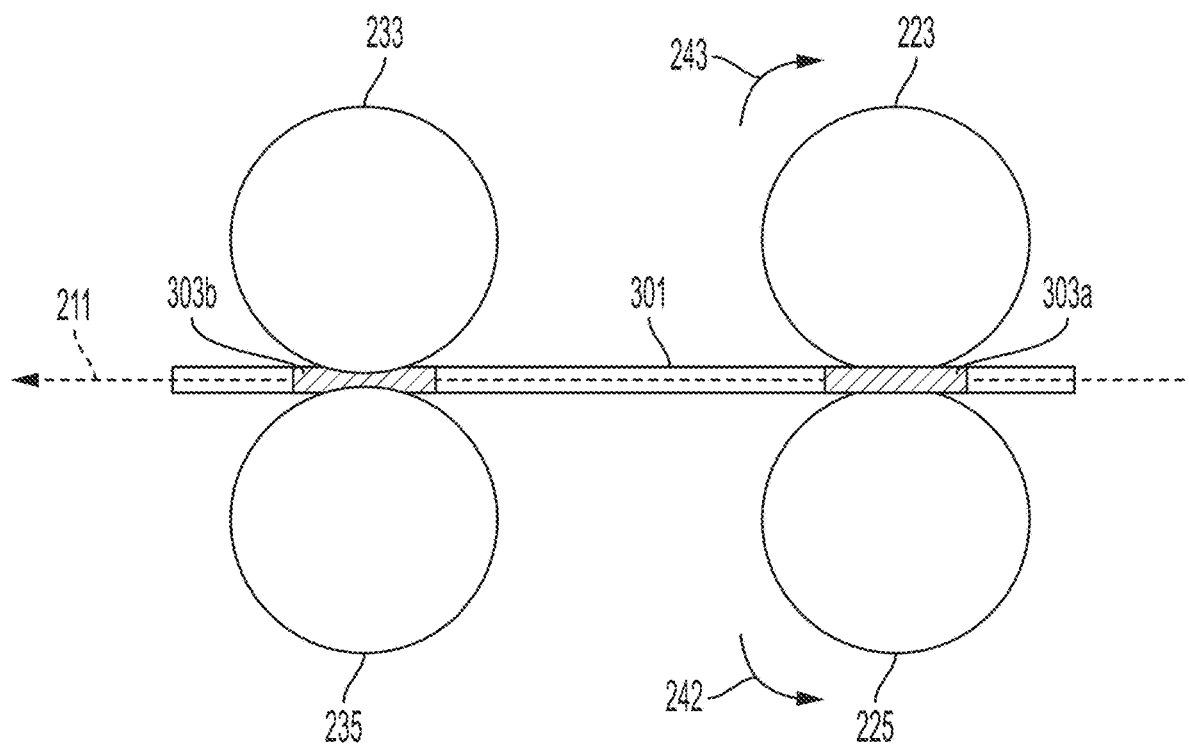
FIG. 3 illustrates example movement of a cleaning card along a media transport path of a media transport device, according to the present disclosure.

FIG. 3 illustrates an example of how a new cleaning card in accordance with this disclosure may be used to clean the rollers and/or other interior components of a media transport device. A cleaning card 301 that includes a substrate having a cleaning layer material on one side, or on opposing sides, of the substrate will be received into the media transport path 211 of the media transport device. When drive roller 225 turns in the counterclockwise direction 242 shown in FIG. 3, the cleaning card 301 will move along the media transport path 211 from right to left as indicated by the arrow at the left end of the media transport path 211. The substrate has one or more deformable cleaning elements 303*a*, 303*b* (which this document may generally refer to using reference number 303). Structure and operation of the deformable cleaning elements 303*a*, 303*b* will be discussed in more detail below with reference to FIGS. 4-6B.

Figure 4:
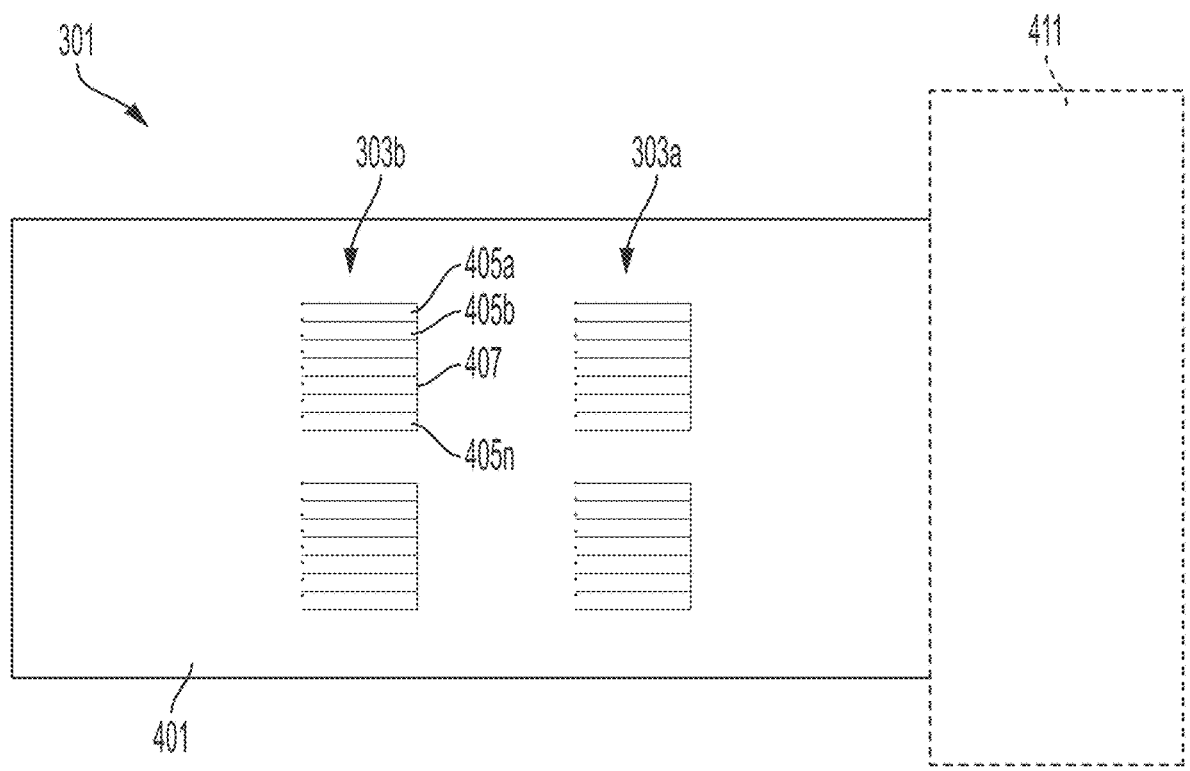
FIG. 4 shows structural features of a deformable cleaning card, as viewed from either the top or the bottom of the card.

For example, FIG. 4 shows structural features of a deformable cleaning card 301, as viewed from either the top or the bottom of the card, depending on how the card is oriented when placed into the media transport device. In this context, "top" and "bottom" are simply relative terms indicating opposite sides of the cards that provide a cleaning surface with deformable cleaning elements formed in the surface. When the card 301 is placed and/or moved in the media transport path, the top and/or bottom will face and contact the rollers of the media transport device. The cleaning card 301 comprises a substrate 401 having a cleaning layer material and any number of deformable cleaning elements 303*a*, 303*b*, which are positioned to align with and contact one or more of the rollers when inserted into the media transport path of the device. This is shown by way of example in FIG. 3, where a first deformable cleaning element 303*a* is positioned to align with and contact first drive roller 225 and first idler roller 223, while a second deformable cleaning element 303*b* is positioned to align with and contact second drive roller 235 and second idler roller 233. As noted above, the idler rollers are optional in various embodiments, as not all systems include idler rollers against every drive roller. Further, in some systems the idler rollers may be positioned near, but not directly against, the drive rollers.

Returning to FIG. 4, each deformable cleaning element (e.g., 303*b*) comprises a border 407 that surrounds an opening, and the opening is substantially filled with a plurality of bristles 405*a* . . . 405*n*, each of which comprises at least the cleaning layer material and extends from the border 407 into opening. The border 407 is formed by a cut line or perforation in the substrate that extends along the border, except for positions in which the bristles 405*a* . . . 405*n* attach to and extend from the border into the opening. The positions along the border 407 to which first ends of the bristles 405*a* . . . 405*n* attach to and extend from the border 407 into the opening are shown as a dotted line in FIG. 4. At this point, the border 407 may include a fold line or crease, or it may have no structural difference from the remainder of the substrate 401. The remaining segments of the border 407, which are formed by cut lines or perforations, are shown as solid lines in FIG. 4. Cut lines or perforations are also positioned between adjacent bristles (such as between bristles 405*a* and 405*b*).

Each cut line or perforation that serves as a border line, as well as the cut lines or perforations between bristles, will be very thin. In some embodiments, each cut line or perforation has a thickness that is from approximately 0.012 inch (approximately 1/64 inch) to approximately 0.125 inch (i.e., approximately 1/8 inch). In other embodiments, each cut line or perforation has a thickness that is from approximately 0.012 inch (approximately 1/64 inch) to approximately 0.25 inch (i.e., approximately 1/4 inch). Other thickness ranges may include a range having (a) a lower limit of approximately 0.012 inch (approximately 1/64 inch) and (b) an upper limit that is any fraction between approximately 2/64 and approximately 16/64 (i.e., approximately 1/4) or any value within that range such as approximately 8/64 (i.e., approximately 1/4). Other thickness ranges may include ranges from approximately 0.010 inch to approximately 0.060 inch, or any upper and lower limits within that range. In this way, referring to FIG. 5. the bristles of each deformable cleaning element 303a, 303b will be co-planar with (i.e., perpendicular to and not extend away from) a lateral plane of the substrate before the cleaning card is used to clean a media transport device. Optionally, the thickness of the As shown in FIG. 4, the bristles 405a . . . 405n will extend from the substrate into the opening from a first end to a second end in a direction that is opposite at least an initial machine direction (i.e., right to left as shown in FIG. 2). Thus, the bristles 405a . . . 405n will fill their corresponding opening before the card is used to clean the media transport system. In this context, "filled" means to fill all areas of the opening other than the cut lines and/or perforations. The bristles 405a . . . 405n will substantially fill each opening, and the very small thickness of the border lines will allow the bristles to contact each other and be held in place by friction (or by direct contact, if perforations are employed) before the card is inserted into the media transport device. In this configuration, initially receiving the cleaning card into the media transport path causes the first ends of the bristles (which are connected to the substrate) to contact the drive roller before the second ends of the bristles (which are separated from the substrate by the border) contact the drive roller.

Figure 5:
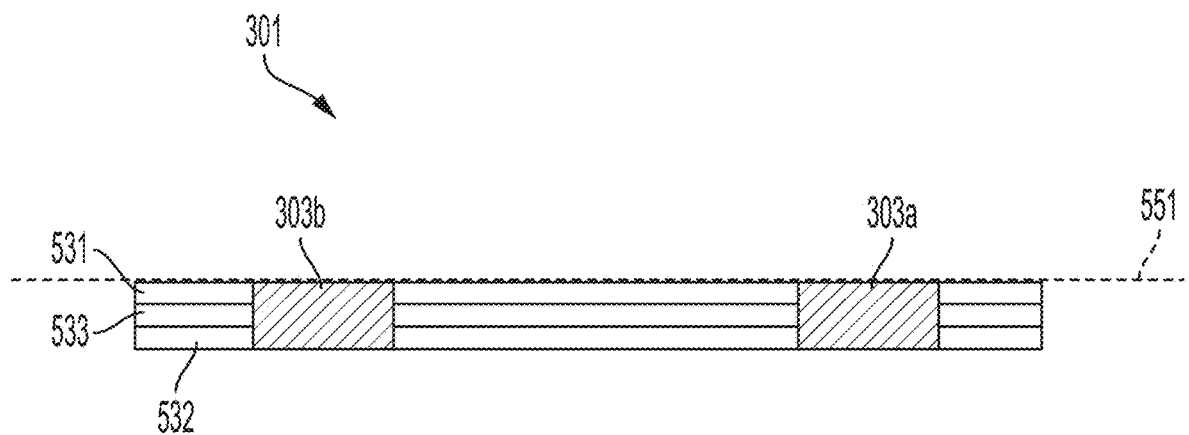
FIG. 5 shows structural features of a deformable cleaning card, as viewed from a side bottom of the card.

FIG. 5 shows a side view of the card 301, which reveals that the card may be formed of any number of layers of material. At least a first layer 531 of cleaning material will be positioned on a top face of the card. The first layer 531 of cleaning material may be made of a soft fabric or other soft material such as unbroken loop (UBL) material, a microfiber material, or a flocked material. Other materials are possible.

A support layer 533 may be attached to the first layer to provide reinforcement to the first layer of cleaning material 531. The support layer 533, when included, may be made of a flexible, tear-resistant fibrous material such as a fibrous aramid or meta-aramid fabric material such as that marketed under the NOMEX® brand; a cellulosic material; a foam material; or a flexible polymeric substrate provided with thin, non-woven layers made of absorbent material such as that marketed under the SONTARA® brand. The support layer 533 also may be made of polyvinyl chloride, polypropylene, polyurethane foam, or any similar material. In any event, the support layer 533 will be formed of a material that is more rigid and/or durable than the first layer of cleaning material.

Optionally, a second layer 532 of cleaning material may be positioned on a bottom face of the card. The second layer 532 of cleaning material may be made of any of the materials described above for the first layer 531, and it may or may not be the same material as is used for the first layer 531, Other materials are possible. The second layer 532 of cleaning material may be positioned on a bottom face of the card, attached to the support layer 533 if employed, or directly attached to the first cleaning layer 531 if no support layer is employed. The card may include any number of additional layers, such as adhesive layers, other support or other core layers, or other material layers.

The various adjacent layers may be attached to each other using an adhesive, by lamination, by ultrasonic welding, by applying combination of heat and pressure to the layers to partially melt at least one layer and bond that layer to an adjacent layer. In other embodiments, the support layer formed by extrusion of a heated material, and the cleaning layer may be affixed to the support layer before it cools, thus forming a bond between the layers.

In various embodiments, the cleaning tool is made of a material with a thickness such that the tool is not completely rigid or brittle (i.e., it is flexible enough to allow for some bending without breaking) but is not floppy and remains substantially planar when held from one end. In this way, the bristles remain co-planar with the substrate prior to use, and the bristles are not drawn toward the ground by gravity. In this way, the bristles remain in their original position until they are moved from that position by the applied force of a drive roller. The layers of the cleaning tool may have various thicknesses, which may be the same as each other or different from each other. For example, any of the layers may have a thickness that is within a range of approximately 0.01 inch to approximately 0.23 inch, or approximately 0.01 inch to 0.04 inch. In some embodiments, the overall thickness of the uncompressed cleaning card may be from approximately 0.01 to approximately 0.24 inch. Other thicknesses are possible.

Optionally, at least one of the layers may be coated with a cleaning solution such as a solvent so that internal components of the media transport device may be more effectively cleaned when the components move along or across the cleaning face of the substrate. Example cleaning solutions include isopropyl alcohol, deionized water, alkaline surfactants, and other materials or combinations of these. Alternatively, the cleaning layer material of the card may be textured or made of fiber that will promote friction when a movable object is moved against the cleaning face. Example textures and structural elements are disclosed in, for example, U.S. Pat. Nos. 7,732,240; 7,631,390; 7,846,534; 10,189,650; 11,410,003; 11,110,492; and 11,710,011; and U.S. Patent Application Publication Number 2022/0258214, the disclosures of which are all incorporated into this document by reference.

Regardless of the number of layers the bristles of each deformable cleaning element (and the cut lines or perforations around them) will extend through all of the layers.

Returning to FIG. 2, during use, after the card is inserted and received into the media transport device, the bristles of one or more of the deformable cleaning elements (such as element 303a), will be positioned against a drive roller 225 in the media transport path of the media transport device. The drive roller 225 will be turned while pressing against the bristles, which in turn cause the bristles to deform and extend from the lateral plane of the substrate in multiple directions while contacting and cleaning the drive roller 225. The cleaning card 301 will then be moved out of the media transport path.

Figure 6A:
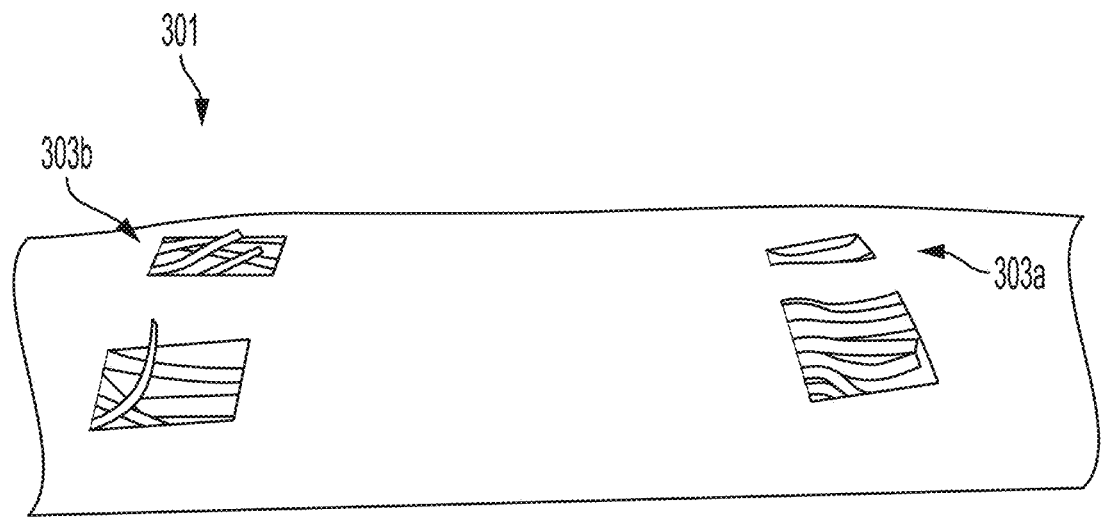
FIGS. 6A and 6B show structural features of a deformable cleaning card after it has been used to clean the interior of a media transport device.
Figure 6B:

This result is shown by way of example in FIG. 6A, which shows the top of a card 301, and FIG. 6B, which shows the bottom of a card 301, in each case after the has been passed into and removed from the media transport device. As shown, some bristles of the deformable cleaning elements 303a, 303b extend upward from the top of the card, while other bristles of the deformable cleaning elements 303a, 303b extend downward from the bottom of the card 301. The deformation patterns of the bristles are not uniform; some bristles are bent, others are curved, in each case extending from the card at various different angles. A few bristles remain in their original position, co-planar with the lateral plane of the card 301. The exact arrangement of the bristles after use will typically vary from time to time depending on the force applied by the rollers, the time to which the rollers are applied to the bristles, the materials used in the card, the amount of contaminants present on the rollers; and/or other factors.

To move the cleaning card 301 within the media transport path, the drive roller 225 may turn and exert force against the card. For example, in FIG. 3 drive roller 225 turns in a counterclockwise direction of rotation 242 to advance the card, or as the card 301 advances, in the machine direction along the media transport path 211. To move the card 301 out of the transport path, the card 301 may continue to move along the path to an exit port that is at the end of the media transport path. Alternatively, the direction of rotation 242 of the drive roller 225 may be reversed to return the card to the port from which the card 301 entered the media transport path 211. In either case, if an idler roller 223 is positioned opposite the drive roller 225, the idler roller will rotate in a direction of rotation 243 that is opposite the direction of rotation 242 of the drive roller. The rotation of the idler roller 223 will happen in reaction to the force applied to the idler roller 223 by the card 301 as the drive roller 225 presses the card against the idler roller 223.

Figure 7:
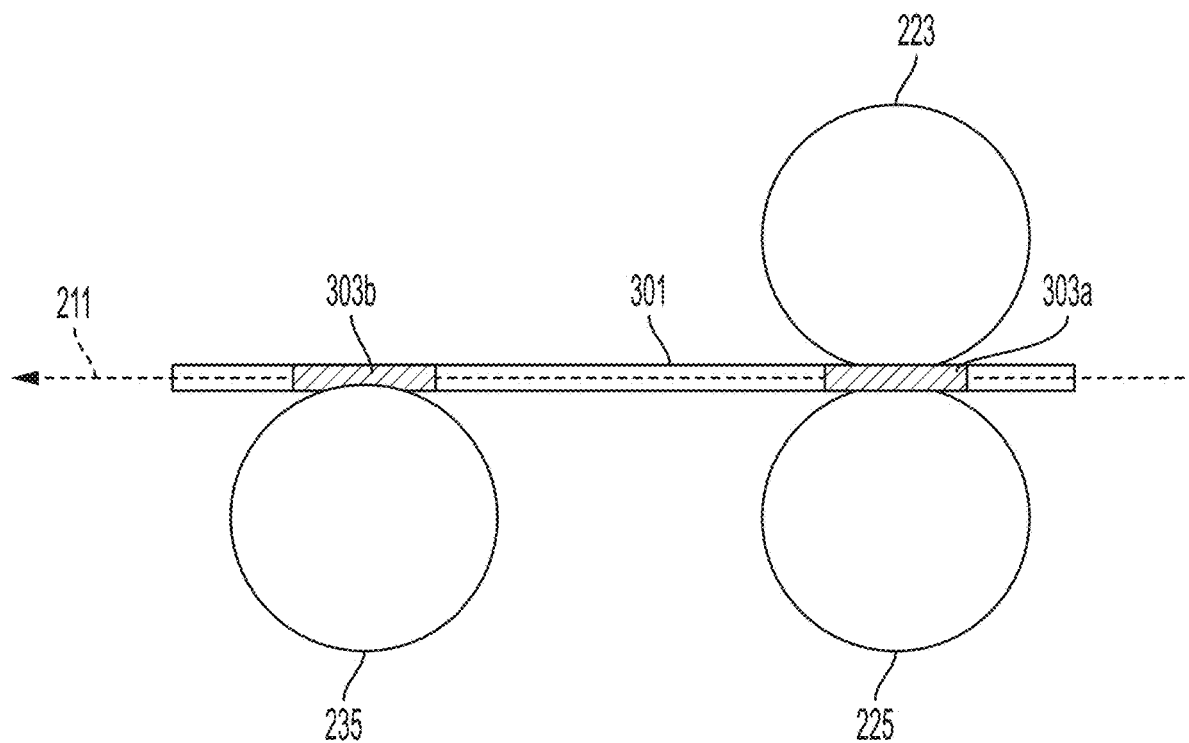
FIG. 7 illustrates example movement of a cleaning card along a media transport path of a media transport device that has components arranged differently than that shown in FIG. 3.

Optionally, in some embodiments, not all drive rollers may be positioned against or opposite corresponding idler rollers. For example, FIG. 7 illustrates an embodiment in which the second drive roller 235 has no corresponding idler roller. In this case, the second deformable cleaning element 303b will still contact and clean the second drive roller 235, although with perhaps less force than the first deformable cleaning element 303a will contact and clean the first drive roller 225.

The cleaning card 301 may be moved through the media transport path 211, and the drive rollers 225, 235, may be turned, by manual operation, by operation of a motor, or by a combination of the two. Optionally, referring to FIG. 4, the card may include a handle 411 that extends from or is integral with the substrate 401 of the card. In this way, a user may hold the handle 411 outside of the media transport path while the substrate 401 is positioned within the media transport path to clean the rollers of the device. The handle 411 can also be used to move the substrate 401 inward and outward, and optionally to wiggle the card from side to side, to move the substrate 401 over a range of positions in the media transport path. The handle 411 may be wider than, narrower than, or the same width as the substrate 401. If the handle 411 is wider than both the substrate and a portal of the media transport path into which the card 301 is inserted, the device's portal may block the handle 411 from entering the media transport path, and the handle may thus hold the card or limit its travel within the path regardless of whether the user maintains their grasp on the handle 411.

Figure 8:
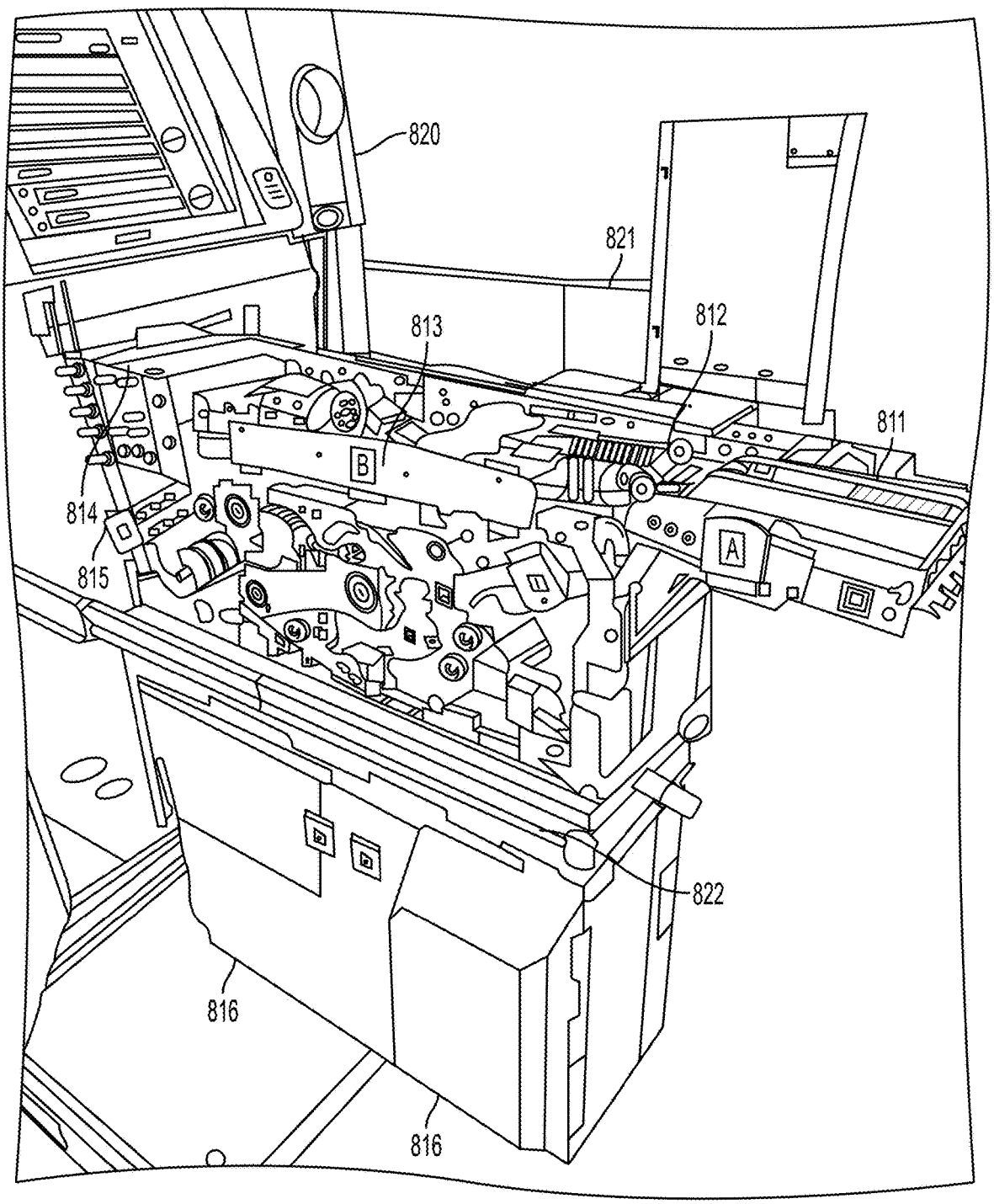
FIG. 8 illustrates example interior components of a media transport device, with examples of portals via which a cleaning card may be received into the device.

The examples above describe applications in which the cleaning card is inserted into a portal that is also used to receive or dispense media, such as transaction cards, tickets, or currency. However, the cleaning cards described above are not limited to such applications. In some embodiments, an operator may open the media transport device and place the cleaning card in the media transport path. This is illustrated by way of example in FIG. 8, which shows an automated teller machine that includes the components previously discussed above in FIG. 1. The machine includes a housing 820 that contains the media transport device. As shown in FIG. 8, optionally the housing may include a door 821 and one or more extendible rails 822, shuttles, or other movable mechanisms that may be used to remove at least part of the media transport system from the housing 820.

The media transport system includes components such as a receiver 811 that includes belts, rollers or other conveying mechanisms that will receive printed media into the system via an opening in the housing. For media transport systems that are currency transport systems, the receiver 811 may be referred to as a currency acceptor. The media transport system also may include a separator module 812 that includes belts, rollers or other media conveyor devices that separate stacked printed media, such as stacked checks or currency notes. In currency transport systems, such rollers are sometimes referred to as "pick rollers" or "pick wheels." The media transport system also may include an alignment module 813 that includes belts, rollers or other conveying mechanisms that will adjust a position of the media with respect to an internal reference point. The media transport system also may include an imaging system 814 with a camera and/or other sensors and associated programming that can detect what the media is and/or what is printed on the media. The media transport system also may include a transport module 815 with one or more belts, rollers or other media conveyors that will move the printed media to an appropriate destination 816 such as a shuttle, bin or exit port. The media transport system also may include other modules, such as a printer that can apply additional printed markings to the printed media. The areas within each module through which the printed media passes form a media travel pathway from the receiver's intake to the final destination.

After a media transport device is opened as in FIG. 8, a person may open a portal of the machine, such as door 821, to gain access to components machine's media transport device. Then, the user may place the cleaning card into the media transport path. The user may still use a typical media exit or entrance portal (such as a ticket dispensing and/or accepting portal), or the user may use a portal that is not accessible during normal operation of the device, such as when the device's drive roller motor or other motor of the media transport system is actuated. Such a portal will be formed by opening the door 821, or by opening one or more of the modules that form the media travel pathway. The cleaning substrate will be inserted into a media travel pathway of the media transport device through that portal, and the cleaning substrate will be placed into a fixed position without operating the motor that actuates the media conveyors (i.e., belts and/or rollers) of the media transport device. After the card is placed into position, a user may operate the device's motor to turn the belts or rollers, or the user may manually turn the belts and/or rollers without activating the device's motors.

In addition, in some embodiments placing the card into the media transport path, or manual activation of the device, may trigger a "cleaning mode" in which the card is held in place by one or more components of the device while the drive rollers are operated. This is illustrated by way of example in FIGS. 9A-9C. In both figures, the media transport device includes a gate 904 at or near the entrance or exit portal of to the media transport path. When the cleaning card 901 is placed into the device, the device detects the card (as it normally does any other media) and opens the gate 904 so that the card can move into the media transport path. (See FIG. 9A.) However, when the device's cleaning mode is triggered, the gate 904 closes so that the rollers may turn without causing the card to exit the media transport device through the portal. Instead, the gate 904 may block the card's access to the portal until the cleaning mode is complete as in FIG. 9B, or the gate 904 may exert pressure against the top or bottom of the card to hold the card in place as in FIG. 9C. When the cleaning mode is complete, the gate 904 will open (as in FIG. 9A) and the card will be dispensed out of the portal by continued activation of the device's drive rollers 225, 235, belts, and/or other components. The cleaning mode may be activated by a processor and programming instructions that are configure the processor to actuate the media transport device's gates and motors as described above in response to various signals.

Figure 9A:
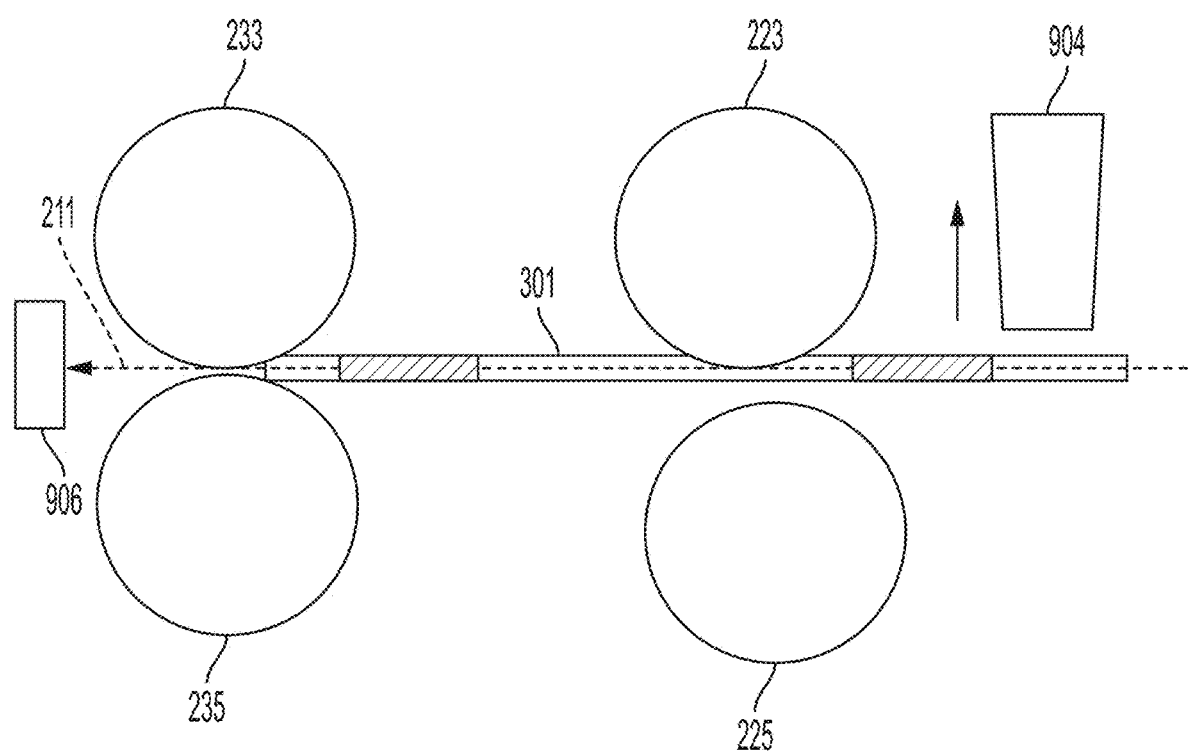
FIGS. 9A-9C illustrate an embodiment in which a media transport device operates in a cleaning mode, holding a cleaning card in place in the media transport path while the rollers turn and are cleaned by the card.
Figure 9B:
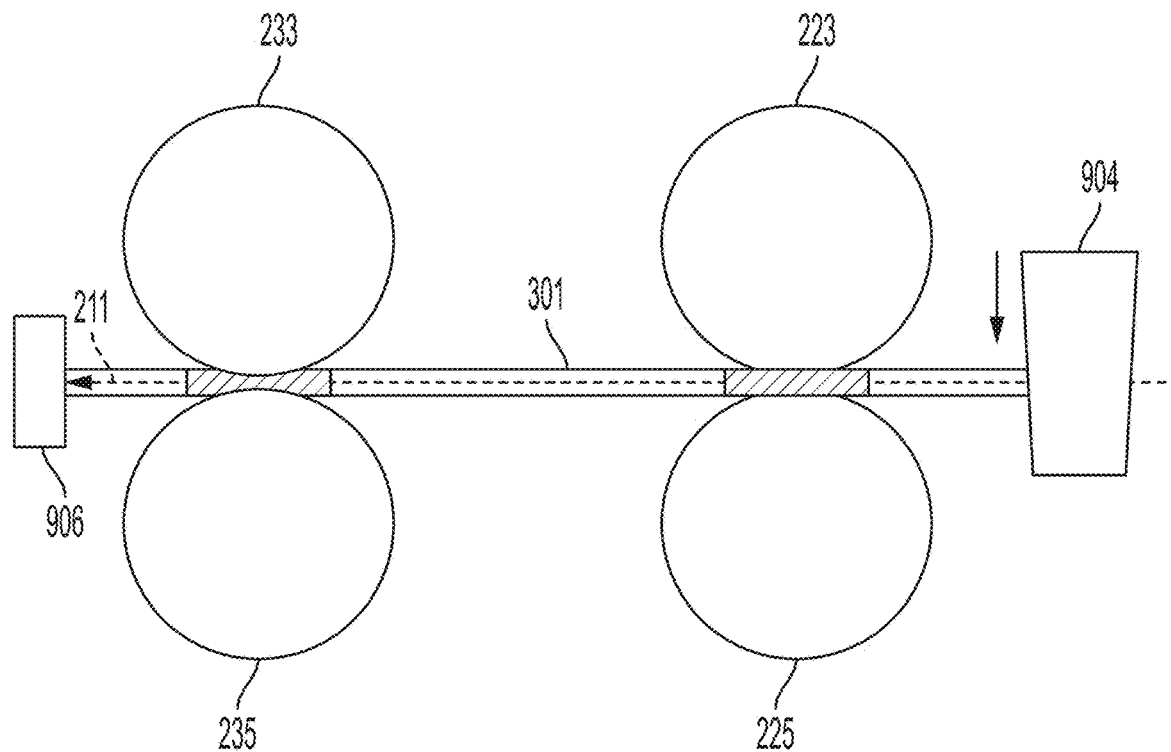
Figure 9C:
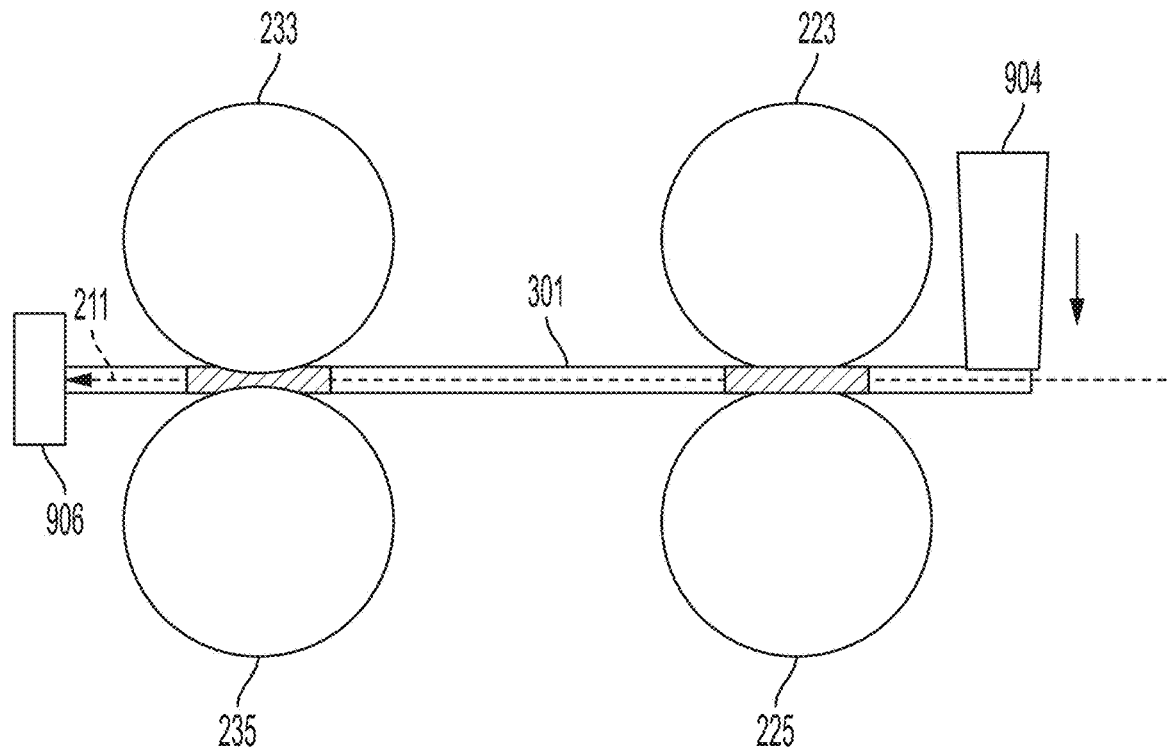

In the embodiment of FIGS. 9A-9C, the cleaning mode may be triggered in any number of ways, depending on the programmed capabilities of the media transport device. For example, the device may have store one or more codes associated with cleaning cards, and the device may have sensors that can read characters or a code on the cleaning card. If the information that the device reads from the card matches a code that the device associates with a cleaning card, the device may initiate a cleaning mode. Alternatively, a user of the device may activate a cleaning mode using a user interface of the device, or of another electronic device that can be used to control the media transport device.

In addition, the embodiment of FIGS. 9A-9C shows an example of a transaction card reader in which the device includes a barrier 906 at the end of the media transport path 211. The barrier will limit the card's path of travel in the media transport device, serve as an end to the media transport path 211, and block the card 301 from moving past the barrier 906. In some embodiments, if the device has portals at both ends of the media transport path, the barrier 906 also may be a gate that remains closed when the device is in cleaning mode, but which opens when the cleaning mode is complete.

The methods and systems described above may result in significant time savings as compared to manual cleaning, and they provide improvements in effectiveness over prior art cleaning cards in various applications, especially in connection with the cleaning of drive rollers and/or idler rollers. In addition, they can help ensure that cleaning occurs in small and/or hard-to-reach segments within the media transport device.

The features and functions described above, as well as alternatives, may be combined into many other different systems or applications. Various alternatives, modifications, variations or improvements may be made by those skilled in the art, each of which is also intended to be encompassed by the disclosed embodiments.

Various aspects of the disclosed embodiments may be summaries in the clauses below:

Clause 1: A method of cleaning interior components in a media transport path of a media transport device. The method includes receiving a cleaning card into the media transport path of the media transport device. The cleaning card comprises a substrate having a cleaning layer material and a deformable cleaning element, in which: (a) the deformable cleaning element comprises a border that surrounds an opening, and the opening is substantially filled with a plurality of bristles, each of which comprises the cleaning layer material and extends from the border into the opening; and (b) the bristles are co-planar with a lateral plane of the substrate before the cleaning card is used to clean the media transport device. The method also includes positioning the bristles against a drive roller in the media transport path of the media transport device. The method also includes turning the drive roller, and in turn causing the bristles to deform and extend from the lateral plane of the substrate in a plurality of directions while contacting and cleaning the drive roller. The method then includes moving the cleaning card out of the media transport path.

Clause 2: The method of clause 1, wherein turning the drive roller comprises manually operating the drive roller.

Clause 3: The method of clause 1 or 2, wherein turning the drive roller comprises causing a motor to turn the drive roller.

Clause 4: The method of any preceding clause, wherein the drive roller is positioned opposite an idler roller of the media transport device, and turning the drive roller also causes the bristles to contact and clean the idler roller.

Clause 5: The method of any preceding clause, wherein the border comprises a cut line or perforation in the substrate that extends along the border, except for positions in which the bristles extend from the border into the opening. Each Clause 6: The method of clause 5, wherein: each of the bristles has a first end and a second end; the first end of each bristle is attached to the border; and the second end of each bristle is separated from the border by the cut line or the perforation.

Clause 7: The method of clause 5 or 6, wherein the cut line or the perforation has a thickness of from approximately 0.012 inch to approximately 0.125 inch, from approximately 0.012 inch to approximately 0.25 inch, or other thicknesses within or outside of those ranges.

Clause 8: The method of clause 6, wherein: the bristles extend from the border in a direction that is opposite an initial machine direction of the media transport device; and receiving the cleaning card into the media transport path causes the first ends of the bristles to contact the drive roller before the second ends of the bristles contact the drive roller.

Clause 9: The method of any preceding clause, wherein receiving the card into the media transport path comprises receiving the card via a portal that is not accessible during normal operation of the media transport device.

Clause 10: The method of any preceding clause further comprising, after receiving the cleaning card into the media path, initiating a cleaning mode in which a gate is closed to hold the cleaning card in the media transport path while the drive roller is turned. Upon completion of the cleaning mode, the gate is be opened to permit the cleaning card to move out of the media transport path.

Clause 11: A media transport device cleaning card includes a substrate comprising a cleaning layer material, and one or more deformable cleaning elements. Each deformable cleaning element comprises a border that surrounds an opening in the substrate. Each opening is filled with a plurality of bristles. Each of the bristles comprises the cleaning layer material and extends from the border into the opening. The bristles are co-planar with a lateral plane of the substrate before the cleaning card is used to clean a media transport device.

Clause 12: The cleaning card of clause 11, wherein, the border of each opening comprises a cut line or perforation in the substrate that extends along the border, except for positions in which the bristles extend from the border into the opening.

Clause 13: The cleaning card of clause 12, wherein each of the bristles has a first end and a second end, the first end of each bristle is attached to the border of a corresponding opening, and the second end of each bristle is separated from the border of the corresponding opening by the cut line or the perforation.

Clause 14: The cleaning card of clause 12 or 13, wherein the cut line or the perforation has a thickness of from approximately 0.012 inch to approximately 0.125 inch, from approximately 0.012 inch to approximately 0.25 inch, or other thicknesses within or outside of those ranges.

Clause 15: The cleaning card of any of clauses 11-14, wherein after the cleaning card is used to clean the media transport device, the bristles will extend from the lateral plane of the substrate in a plurality of directions.

Clause 16: The cleaning card of any of clauses 11-15, wherein the cleaning layer material comprises an unbroken loop material or a flocked material.

Clause 17: The cleaning card of any of clauses 11-16, wherein the bristles extend from the side of the opening in a direction that is opposite an initial machine direction of the media transport device.

Clause 18: The cleaning card of any of clauses 11-17, further comprising a support layer that is attached to the cleaning layer material, wherein the support layer is more rigid than the cleaning layer material Clause 19: A system includes a media transport device that comprises a media transport path, and a drive roller positioned to move media along the media transport path. The system also includes a cleaning card that comprises a substrate comprising a cleaning layer material, and a deformable cleaning element comprising a border that surrounds an opening in the substrate. The opening is filled with a plurality of bristles. Each of the bristles comprises the cleaning layer material and extends from the border into the opening, and the opening is positioned to contact the drive roller when the cleaning card is received into the media transport path.

Clause 20: The system of clause 19, wherein the bristles of the system's card are configured to be co-planar with a lateral plane of the substrate before the cleaning card is used to clean a media transport device, and the bristles are configured to extend from the lateral plane of the substrate in a plurality of directions after the cleaning card is used to clean the media transport device.

Clause 21: The system of clause 19 or 20, wherein the media transport device of the system is configured to, after receiving the cleaning card into the media path: (a) initiate a cleaning mode that closes a gate and holds the cleaning card in the media transport path while the drive roller is turned; and (b) upon completion of the cleaning mode, open the gate to permit the cleaning card to move out of the media transport path.

The invention claimed is:

1. A method of cleaning interior components in a media transport path of a media transport device, the method comprising:
   receiving a cleaning card into the media transport path of the media transport device, wherein the cleaning card comprises a substrate having a cleaning layer material and a deformable cleaning element, in which:
      the deformable cleaning element comprises a border that surrounds an opening, and the opening is substantially filled with a plurality of bristles, each of which comprises the cleaning layer material and extends from the border into the opening, and
      the bristles are co-planar with a lateral plane of the substrate before the cleaning card is inserted into the media transport device;
   positioning the bristles against a drive roller in the media transport path of the media transport device;
   turning the drive roller, and in turn causing the bristles to deform and extend from the lateral plane of the substrate in a plurality of directions while contacting and cleaning the drive roller; and
   moving the cleaning card out of the media transport path.

2. The method of claim 1, wherein turning the drive roller comprises manually operating the drive roller.

3. The method of claim 1, wherein turning the drive roller comprises causing a motor to turn the drive roller.

4. The method of claim 1, wherein:
   the drive roller is positioned opposite an idler roller of the media transport device; and
   turning the drive roller also causes the bristles to contact and clean the idler roller.

5. The method of claim 1, wherein receiving the card into the media transport path comprises receiving the card via a portal that is not accessible during normal operation of the media transport device.

6. The method of claim 1, further comprising, after receiving the cleaning card into the media transport path:
   initiating a cleaning mode in which a gate is closed to hold the cleaning card in the media transport path while the drive roller is turned; and
   upon completion of the cleaning mode, opening the gate to permit the cleaning card to move out of the media transport path.

7. The method of claim 1, wherein the border comprises a cut line or perforation in the substrate that extends along the border, except for positions in which the bristles extend from the border into the opening.

8. The method of claim 7, where the cut line or the perforation has a thickness of from approximately 0.012 inch to approximately 0.25 inch.

9. The method of claim 7, wherein:
   each of the bristles has a first end and a second end;
   the first end of each bristle is attached to the border; and
   the second end of each bristle is separated from the border by the cut line or the perforation.

10. The method of claim 9, wherein:
   the bristles extend from the border in a direction that is opposite an initial machine direction of the media transport device; and
   receiving the cleaning card into the media transport path causes the first ends of the bristles to contact the drive roller before the second ends of the bristles contact the drive roller.

11. A system, comprising:
   a media transport device comprising:
      a media transport path, and
      a drive roller positioned to move media along the media transport path; and
   a cleaning card, comprising:
      a substrate comprising a cleaning layer material,
      a deformable cleaning element comprising a border that surrounds an opening in the substrate, and in which:
         the opening is filled with a plurality of bristles,
         each of the bristles comprises the cleaning layer material and extends from the border into the opening, and
         the opening is positioned to contact the drive roller when the cleaning card is received into the media transport path, wherein:
      the bristles are configured to be co-planar with a lateral plane of the substrate before the cleaning card is inserted into the media transport device; and
      the bristles are configured to extend from the lateral plane of the substrate in a plurality of directions in response to contacting and cleaning the drive roller.

12. The system of claim 11, wherein the media transport device is configured to, after receiving the cleaning card into the media transport path:
   initiate a cleaning mode that closes a gate and holds the cleaning card in the media transport path while the drive roller is turned; and upon completion of the cleaning mode, open the gate to permit the cleaning card to move out of the media transport path.

13. A media transport device cleaning card, comprising:
a substrate comprising a cleaning layer material; and
one or more deformable cleaning elements, each of which comprises a border that surrounds an opening in the substrate, and in which:
   each opening is filled with a plurality of bristles, and each of the bristles comprises the cleaning layer material and extends from the border into the opening,
wherein the bristles are configured to be co-planar with a lateral plane of the substrate before the cleaning card is inserted into a media transport device, and to deform and extend from the lateral plane of the substrate in a plurality of directions in response to contacting and cleaning a drive roller in the media transport device.

14. The cleaning card of claim 13, wherein after the cleaning card is used to clean the media transport device, the bristles will extend from the lateral plane of the substrate in a plurality of directions.

15. The cleaning card of claim 13, wherein the cleaning layer material comprises an unbroken loop material or a flocked material.

16. The cleaning card of claim 13, wherein the bristles extend from the side of the opening in a direction that is opposite an initial machine direction of the media transport device.

17. The cleaning card of claim 13, further comprising a support layer that is attached to the cleaning layer material, wherein the support layer is more rigid than the cleaning layer material.

18. The cleaning card of claim 13, wherein the border of each opening comprises a cut line or perforation in the substrate that extends along the border, except for positions in which the bristles extend from the border into the opening.

19. The cleaning card of claim 18, wherein:
each of the bristles has a first end and a second end;
the first end of each bristle is attached to the border of a corresponding opening; and
the second end of each bristle is separated from the border of the corresponding opening by the cut line or the perforation.

20. The cleaning card of claim 18, where the cut line or the perforation has a thickness of from approximately 0.012 inch to approximately 0.25 inch.

* * * * *